United States Patent
Shubhi et al.

(10) Patent No.: US 12,207,190 B2
(45) Date of Patent: Jan. 21, 2025

(54) WIRELESS DEVICE-AUTONOMOUS PROCEDURES FOR MISSED-WAKE UP SIGNALS

(71) Applicant: Telefonaktiebolaget LM Ericsson (publ), Stockholm (SE)

(72) Inventors: Ilmiawan Shubhi, Malmö (SE); Sina Maleki, Malmö (SE); Gang Zou, Lund (SE); Ali Nader, Malmö (SE); Andres Reial, Lomma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 161 days.

(21) Appl. No.: 17/607,603

(22) PCT Filed: Apr. 7, 2020

(86) PCT No.: PCT/EP2020/059824
§ 371 (c)(1),
(2) Date: Oct. 29, 2021

(87) PCT Pub. No.: WO2020/224898
PCT Pub. Date: Nov. 12, 2020

(65) Prior Publication Data
US 2022/0217628 A1    Jul. 7, 2022

Related U.S. Application Data (60) Provisional application No. 62/842,742, filed on May 3, 2019.

(51) Int. Cl.
*H04W 52/02* (2009.01)

(52) U.S. Cl.
CPC ... *H04W 52/0216* (2013.01); *H04W 52/0229* (2013.01)

(58) Field of Classification Search
CPC ......... H04W 52/0216; H04W 52/0229; H04W 52/028; H04W 76/28; Y02D 30/70
See application file for complete search history.

(56) References Cited

U.S. PATENT DOCUMENTS

| | | | |
|---|---|---|---|
| 9,686,750 B2 * | 6/2017 | Ji | H04W 76/28 |
| 11,564,170 B2 * | 1/2023 | Zhang | H04W 72/23 |
| 2012/0275364 A1 | 11/2012 | Anderson et al. | |

FOREIGN PATENT DOCUMENTS

| | | |
|---|---|---|
| CN | 109219113 A | 1/2019 |
| WO | 2018204799 A1 | 11/2018 |

(Continued)

OTHER PUBLICATIONS

International Search Report and Written Opinion dated Aug. 17, 2020 for International Application No. PCT/EP2020/059824 filed Apr. 7, 2020, consisting of 18-pages.

(Continued)

*Primary Examiner* — Marcos L Torres
(74) *Attorney, Agent, or Firm* — Weisberg I.P. Law, P.A.

(57) ABSTRACT

A method and wireless device (WD) for autonomous WD wake up are disclosed. According to one embodiment, a wireless device configured to communicate with a network node is provided. The wireless device includes processing circuitry configured to determine that a transmitted wake up signal has been missed before a discontinuous reception (DRX) ON-duration, and perform at least one action during the DRX ON-duration based at least in part on the determination that the wake signal has been missed.

31 Claims, 3 Drawing Sheets

```
BEGIN
  ↓
Determine that a transmitted wake up signal has been missed before
a discontinuous reception (DRX) ON-duration
S104
  ↓
Perform at least one action during the DRX ON-duration based at
least in part on the determination that the wake signal has been
missed
S106
  ↓
END
```

(56) References Cited

FOREIGN PATENT DOCUMENTS

| WO | 2018206124 A1 | 11/2018 |
|----|---------------|---------|
| WO | 2019033112 A1 | 2/2019 |
| WO | 2019064203 A1 | 4/2019 |

OTHER PUBLICATIONS

3GPP TSG-RAN WG1 #96 R1-1903016; Title: Potential Techniques for UE Power Saving; Agenda Item: 7.2.9.2; Source: Qualcomm Incorporated; Document for: Discussion/Decision; Date and Location: Feb. 25-Mar. 1, 2019, Athens, Greece, consisting of 33-pages.
3GPP TSG RAN WG1 Ad-Hoc Meeting 1901 R1-1900814; Title: On Triggering of Power Mode Adaptation; Agenda Item: 7.2.9.2.2; Source: InterDigital, Inc.; Document for: Discussion; Date and Location: Jan. 21-25, 2019, Taipei, Taiwan, consisting of 5-pages.
3GPP TSG RAN WG1 Ad-Hoc Meeting #96 R1-1903135; Title: On potential power saving triggering signals; Agenda Item: 7.2.9.4; Source: Nokia, Nokia Shanghai Bell; Document for: Discussion and Decision; Date and Location: Feb. 25-Mar. 1, 2019, Athens, Greece, consisting of 12-pages.
3GPP TSG RAN WG1 Meeting #96bis R1-1903988; Title: PDCCH based power saving signal/channel; Agenda Item: 7.2.9.1; Source: Huawei, HiSilicon; Document for: Discussion and Decision; Date and Location: Apr. 8-12, 2019, Xi'an, China, consisting of 7-pages.
3GPP TSG-RAN2 Meeting #105bis R1-1904149; Title: Impact of WUS on cDRX; Agenda Item: 11.11.4.1 PDCCH based power saving signal/channel; Source: Ericsson; Document for: Discussion and Decision; Date and Location: Apr. 8-12, 2019, Xi'an, China, consisting of 4-pages.
3GPP TSG-RAN2# 106 R2-1906484; Title: Discussion on how the WUS works with C-DRX; Agenda Item: 11.11.4.1; Source: Xiaomi Communications; Document for: Discussion and Decision; Date and Location: May 13-17, 2019, Reno, USA, consisting of 4-pages.
3GPP TSG-RAN WG2 Meeting #101 R2-1802058; Title: Further consideration on wake-up signal; Agenda Item: 9.13.9; Source: ZTE, Sanechips; Document for: Discussion and Decision; Date and Location: Feb. 26-Mar. 2, 2018, Athens, Greece, consisting of 6-pages.
3GPP TSG-RAN WG2 Meeting #103 R2-1812523; Title: Remaining issues on Wake Up Signal; Agenda Item: 9.13.9; Source: Lenovo, Motorola Mobility; Document for: Discussion and Decision; Date and Location: Aug. 20-24, 2018, Gothenburg, Sweden, consisting of 3-pages.
3GPP TSG-RAN WG2 Meeting #106 R2-1905603; Title: Impacts of PDCCH-based wake up signalling; Agenda Item: 11.11.4.1; Source: OPPO; Document for: Discussion, Decision; Date and Location: May 13-17, 2019, Reno, USA, consisting of 6-pages.
Chinese Office Action and English Summary dated Oct. 26, 2023 for Application No. 202080048257.8, consisting of 13 pages.
3GPP TSG-RAN WG1 Meeting #90bis R1-1717009; Title: On Wake-up signal functions; Agenda Item: 6.2.6.1.1.1; Source: Ericsson; Document for: Discussion and Decision; Location and Date: Prague, Czech Republic, Oct. 9-13, 2017, consisting of 4 pages.

\* cited by examiner

WIRELESS DEVICE-AUTONOMOUS PROCEDURES FOR MISSED-WAKE UP SIGNALS

CROSS-REFERENCE TO RELATED APPLICATIONS

This application is a Submission Under 35 U.S.C. § 371 for U.S. National Stage Patent Application of International Application No.: PCT/EP2020/059824, filed Apr. 7, 2020 entitled "WIRELESS DEVICE-AUTONOMOUS PROCEDURES FOR MISSED-WAKE UP SIGNALS," which claims priority to U.S. Provisional Application No. 62/842,742, filed May 3, 2019, entitled "WIRELESS DEVICE (WD)-AUTONOMOUS PROCEDURES FOR MISSED-WAKE UP SIGNALS (WUS)," the entireties of both of which are incorporated herein by reference.

TECHNICAL FIELD

The present disclosure relates to wireless communications, and in particular, to wireless device (WD) autonomous procedures for missed wake up signals (WUS).

BACKGROUND

One of the power consuming activities of wireless devices (WD) in a Radio Resource Control Connected mode (RRC_CONNECTED) mode according to 3GPP standard specifications, is to monitor the physical downlink control channel (PDCCH). In this activity, the WD should perform blind detection in its configured control resource sets (CORESETs) to identify whether there is a PDCCH sent to it, and act accordingly. On the other hand, the WD is not scheduled in most PDCCH monitoring occasions (MOs) and thus, the WD wastes its energy monitoring the channel.

Given this, techniques that can reduce unnecessary PDCCH MOs, i.e., allowing the WD to go to sleep or wake-up only when required can be beneficial. Here, a wake-up signal (WUS) can be considered an efficient solution to improve WD power consumption. In this technique, the WD monitors the PDCCH in the discontinuous reception (DRX) ON-duration, only when a WUS is detected prior to the ON-duration. If there is no WUS transmission by the network node, the WD can remain asleep, i.e., in a low-power mode, during the next ON-duration. Therefore, by conducting the PDCCH monitoring only when there will be physical downlink shared channel (PDSCH) scheduling, the WD power consumption can be reduced. In addition, WUS monitoring can also be conducted in a more power efficient manner compared to that of normal PDCCH monitoring and thus improves the WD energy efficiency even further.

If transmitted by the network node, the WUS is then detected or decoded by the WD and if the WUS is intended for waking up that WD (either specifically or as part of a group), the WD wakes up and monitors the PDCCH search space (SS) in the next ON-duration or follows other types of network-configured actions upon detection of WUS (e.g., perform an aperiodic channel state information (CSI) report, receive PDSCH through WUS commands, etc.)

One of the problems of using WUS arises because the WD may not always successfully detect/decode the WUS in the WUS MOs even when the network (NW) actually sends the WUS to wake-up the WD for the next ON-duration. In this case, as the WD remains in a sleep state, the WD will miss the scheduling PDCCH from the NW during the ON-duration. The data transmission through PDSCH, therefore, cannot be received by the WD in this scenario.

Such circumstances cause an increase in latency and a reduction of throughput. Even more, when the WD misses the PDSCH transmission from the network node for several occasions, and does not provide expected ACK/NACK feedback, the network node can consider the WD to be in Out of Sync (OOS) or in Radio Link Failure (RLF), hence that it has lost its connection to the network. In this condition, the WD needs to restart the connection set-up which requires a significant amount of power. The intended power saving, therefore, is diluted. On the other hand, while in most cases using the WUS is good for power saving, always relying on the WUS is also not the optimum solution.

Therefore, there is a need in defining autonomous procedures/methods/steps that can be taken by the WD to minimize the effect of the missed or un-decoded WUS.

SUMMARY

Some embodiments advantageously provide methods and wireless devices for autonomous wake up of the WD when wake up signals (WUS) are missed or not decoded.

Some embodiments include mechanisms that can be taken by the WD when the WD does not detect WUS in the WUS MOs and can be summarized as follows:

Aspect 1: The WD examines some information that can be used as criteria that the WUS may have been transmitted but not detected. The information can be in the form of history and expected traffics, channel quality, presence of certain signal structures or signal energy, etc.

Aspect 2: The WD may follow some procedures (i.e., autonomous procedures also referred to as one or more actions) by considering the information obtained in the Aspect 1, such as to wake-up on the next ON-duration, send a UL transmission, etc.

Some embodiments lead to a more robust WD operation with respect to WUS transmission. More specifically, the WD could avoid a performance degradation on latency and throughput due to the missed-WUS detection/decoding. In addition, some embodiments also reduce the probability of unnecessary data retransmission and reconnection from the WD to the network node.

According to one aspect of the disclosure, a wireless device configured to communicate with a network node is provided. The wireless device includes processing circuitry configured to: determine that a transmitted wake up signal has been missed before a discontinuous reception (DRX) ON-duration, and perform at least one action during the DRX ON-duration based at least in part on the determination that the wake signal has been missed.

According to one or more embodiments of this aspect, the processing circuitry is further configured to determine at least one configuration parameter included in the wake up signal that has been missed by the wireless device, and the at least one action is based at least in part on the at least one configuration parameter. According to one or more embodiments of this aspect, the processing circuitry is further configured to, if the at least one configuration parameter only includes a command to wake up, implement a previously received configuration parameter for monitoring the DRX ON-duration. According to one or more embodiments of this aspect, the at least one configuration parameter corresponds to at least one command related to the missed wake up signal.

According to one or more embodiments of this aspect, the at least one configuration parameter includes a plurality of configuration parameters for monitoring the DRX ON-duration, and the processing circuitry is further configured to select a subset of the plurality of configuration parameters for monitoring the DRX ON-duration, the subset of the plurality of configuration parameters corresponding to one of a default configuration, a configuration based at least in part on previously received configurations and a plurality of configurations. According to one or more embodiments of this aspect, the determination that the wake up signal has been missed is based at least in part on historic traffic data. According to one or more embodiments of this aspect, the determination that the wake up signal has been missed includes analyzing the historic traffic data to determine that traffic data is expected during at least one predefined duration.

According to one or more embodiments of this aspect, the determination that the wake up signal has been missed is based at least in part on a signal quality of a previously received wake up signal. According to one or more embodiments of this aspect, the determination that the wake up signal has been missed is further based at least in part on a detection of a channel state information reference signal, CSI-RS. According to one or more embodiments of this aspect, the at least one action includes: determining a channel quality between the network node and the wireless device, comparing the determined channel quality to a predefined threshold, and trigger the DRX ON-duration monitoring based at least in part on the comparison. The DRX ON-duration monitoring corresponds to at least one DRX ON-duration associated with the wake up signal that has been missed.

According to one or more embodiments of this aspect, the at least one action includes exiting a sleep state and monitoring a physical downlink control channel, PDCCH, search space in a next DRX ON-duration. According to one or more embodiments of this aspect, the determination that the wake up signal has been missed corresponds to determining the wake up signal has been at least one of not detected and not decoded. According to one or more embodiments of this aspect, the processing circuitry is further configured to determine a demodulation reference signal, DMRS, has been detected, the determination that the wake up signal has been missed being based at least in part on the detected DMRS.

According to one or more embodiments of this aspect, the processing circuitry is further configured to examine power levels of a plurality of resource elements that are configured to carry the wake up signal that has been missed, the determination that the wake up signal has been missed being based at least in part on the examined power levels of the plurality of resource elements. According to one or more embodiments of this aspect, the processing circuitry is further configured to cause transmission of an indication indicating that a wake up signal was missed and that the wireless device performed DRX ON-duration monitoring associated with the wake up signal that has been missed. According to one or more embodiments of this aspect, the indication is a negative acknowledgment, NACK. According to one or more embodiments, the processing circuitry is configured to determine that a channel quality of a first antenna beam is deteriorated based at least in part on detection of another WUS over a second antenna beam during synchronization signal block, SSB, measurements, and the determination that the transmitted wake up signal has been missed is based at least in part on the determination of the channel quality of the first antenna beam.

According to another aspect of the disclosure, a method implemented by a wireless device that is configured to communicate with a network node is provided. A determination is made that a transmitted wake up signal has been missed before a discontinuous reception (DRX) ON-duration. At least one action is performed during the DRX ON-duration based at least in part on the determination that the wake signal has been missed.

According to one or more embodiments of this aspect, at least one configuration parameter included in the wake up signal that has been missed by the wireless device is determined where the at least one action is based at least in part on the at least one configuration parameter. According to one or more embodiments of this aspect, if the at least one configuration parameter only includes a command to wake up, a previously received configuration parameter for monitoring the DRX ON-duration is implemented. According to one or more embodiments of this aspect, the at least one configuration parameter corresponds to at least one command related to the missed wake up signal.

According to one or more embodiments of this aspect, the at least one configuration parameter includes a plurality of configuration parameters for monitoring the DRX ON-duration. A subset of the plurality of configuration parameters for monitoring the DRX ON-duration are selected where the subset of the plurality of configuration parameters correspond to one of a default configuration, a configuration based at least in part on previously received configurations and a plurality of configurations. According to one or more embodiments of this aspect, the determination that the wake up signal has been missed is based at least in part on historic traffic data. According to one or more embodiments of this aspect, the determination that the wake up signal has been missed includes analyzing the historic traffic data to determine that traffic data is expected during at least one predefined duration.

According to one or more embodiments of this aspect, the determination that the wake up signal has been missed is based at least in part on a signal quality of a previously received wake up signal. According to one or more embodiments of this aspect, the determination that the wake up signal has been missed is further based at least in part on a detection of a channel state information reference signal, CSI-RS. According to one or more embodiments of this aspect, the at least one action includes: determining a channel quality between the network node and the wireless device, comparing the determined channel quality to a predefined threshold, and triggering the DRX ON-duration monitoring based at least in part on the comparison, the DRX ON-duration monitoring corresponding to at least one DRX ON-duration associated with the wake up signal that has been missed.

According to one or more embodiments of this aspect, the at least one action includes exiting a sleep state and monitoring a physical downlink control channel, PDCCH, search space in a next DRX ON-duration. According to one or more embodiments of this aspect, the determination that the wake up signal has been missed corresponds to determining the wake up signal has been at least one of not detected and not decoded. According to one or more embodiments of this aspect, a determination is made that a demodulation reference signal, DMRS, has been detected where the determination that the wake up signal has been missed is based at least in part on the detected DMRS.

According to one or more embodiments of this aspect, power levels of a plurality of resource elements that are configured to carry the wake up signal that has been missed are examined where the determination that the wake up signal has been missed is based at least in part on the examined power levels of the plurality of resource elements. According to one or more embodiments of this aspect, transmission is caused of an indication indicating that a wake up signal was missed and that the wireless device performed DRX ON-duration monitoring associated with the wake up signal that has been missed. According to one or more embodiments of this aspect, the indication is a negative acknowledgment, NACK. According to one or more embodiments, a determination that a channel quality of a first antenna beam is deteriorated is made based at least in part on detection of another WUS over a second antenna beam during synchronization signal block, SSB, measurements, and the determination that the transmitted wake up signal has been missed is based at least in part on the determination of the channel quality of the first antenna beam.

According to another aspect of the disclosure, a computer readable medium is provided. The computer readable medium includes instructions which, when executed by a processor, cause the processor to: determine that a transmitted wake up signal has been missed before a discontinuous reception, DRX, ON-duration, and perform at least one action during the DRX ON-duration based at least in part on the determination that the wake signal has been missed. According to one or more embodiments, the computer readable medium further includes instructions which, when executed by the processor, cause the processor to perform one or more of the additional steps described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to wireless device (WD) autonomous procedures for handling missed wake up signals (WUS). As used herein, a missed wake up signal at the wireless device may correspond to a wake up signal that has been transmitted to the wireless device where the wireless device does not detect the wake up signal, or where the wireless device receives a wake up signal (including sample collection) but fails to properly decode the wake up signal.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "connected," and the like, may be used herein to indicate a connection, although not necessarily directly, and may include wired and/or wireless connections.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), IEEE 802-11, Wireless Local Area Network (WLAN), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
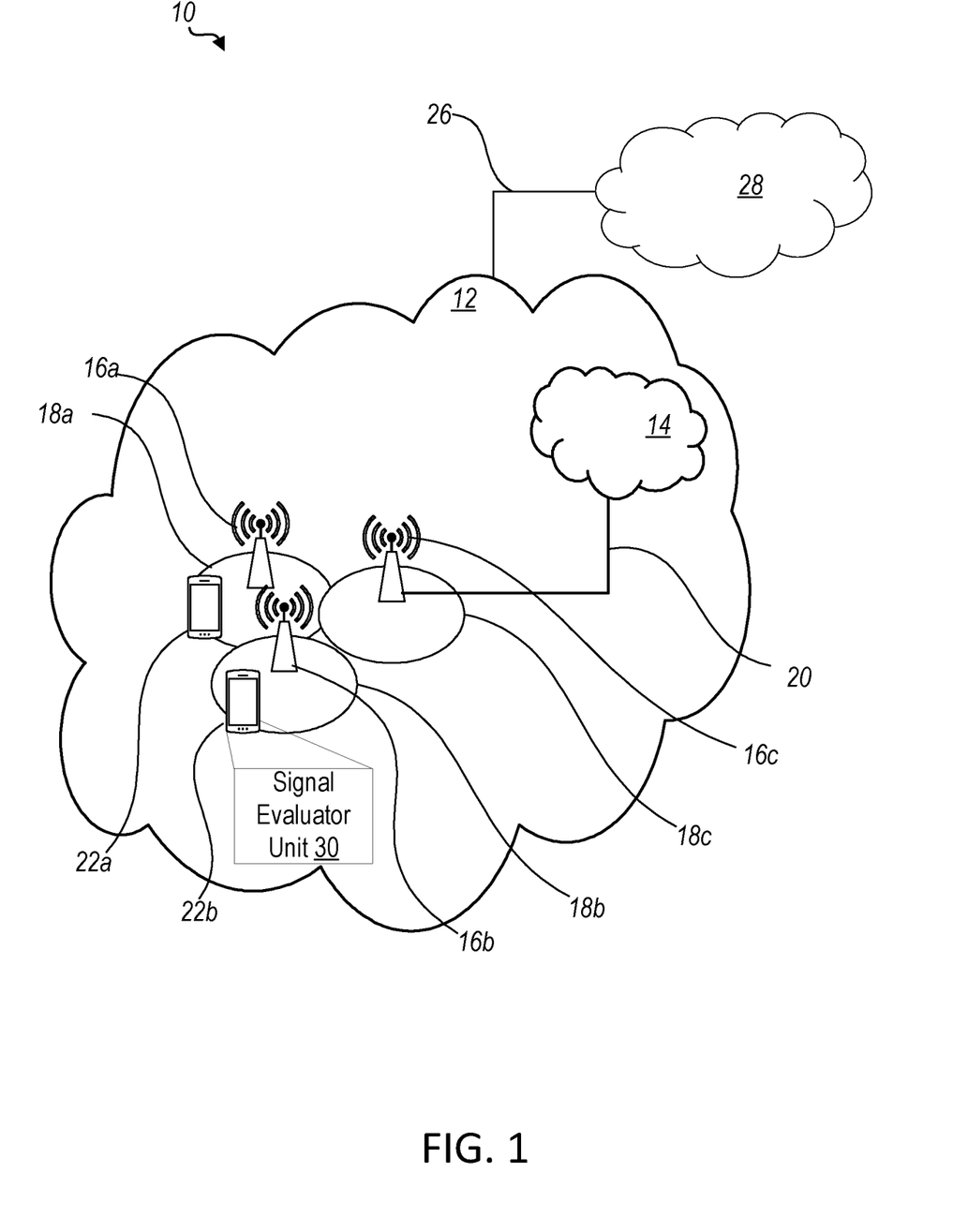
FIG. 1 is a schematic diagram of an exemplary network architecture illustrating a communication system according to the principles in the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 22b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The intermediate network 28 may be one of, or a combination of more than one of, a public, private or hosted network. The intermediate network 28, if any, may be a backbone network or the Internet. In some embodiments, the intermediate network 28 may comprise two or more sub-networks (not shown).

A wireless device 22 is configured to include a signal evaluator unit 30 which is configured to evaluate at least one signal to determine an indication of a time for the WD 22 to wake up in the absence of receiving or decoding a wake up signal from the network node. In particular, it may be assumed, for example, that a WD is configured with one or more WUS monitoring occasions (MOs) X slots before the ON-duration. Alternatively, a WUS can also occur X slots before any data which needs to be transmitted from the network node to the WD (e.g., a scheduling PDCCH). If there is no WUS detected or decoded by the WD during the WUS MOs, the default option for the WD may be to skip monitoring the PDCCH SS in the next DRX ON-duration; however, other options such as more robust options that can be taken by the WD such as via the signal evaluator unit 30 when there is no WUS detected/decoded are further described below. In one or more embodiments, as used herein, DRX-ON-duration may refer to a period of time (i.e., awake state/period) during which the wireless device 22 monitors a downlink control channel (e.g., PDCCH) where the wireless device 22 may enter a sleep state (e.g., non-monitoring state) when not in the ON-duration.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 37 with a WD 22 located in a coverage area 18 served by the network node 16. The radio interface 36 may be formed as or may include, for example, one or more RF transmitters, one or more RF receivers, and/or one or more RF transceivers. The communication interface 34 may be configured to facilitate a connection to one or more other entities in communication system 10 such as another network node 16 and/or the core network 14. The connection may be direct or it may pass through a core network 14 of the communication system 10 and/or through one or more intermediate networks 28 outside the communication system 10.

In the embodiment shown, the hardware 32 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16.

The communication system 10 further includes the WD 22 already referred to. The WD 22 may have hardware 46 that may include a radio interface 48 configured to set up and maintain a wireless connection 38 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54 (i.e., computer readable medium), which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22, in providing the service to the user, the client application 58 may receive request data and provide user data in response to the request data. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may include a signal evaluator unit 30 configured to perform one or more wireless device 22 functions as described herein. In one or more embodiments, signal evaluator unit 30 is configured to evaluate at least one signal to determine an indication of a time for the WD to wake up in the absence of receiving or decoding a wake up signal from the network node.

Figure 2:
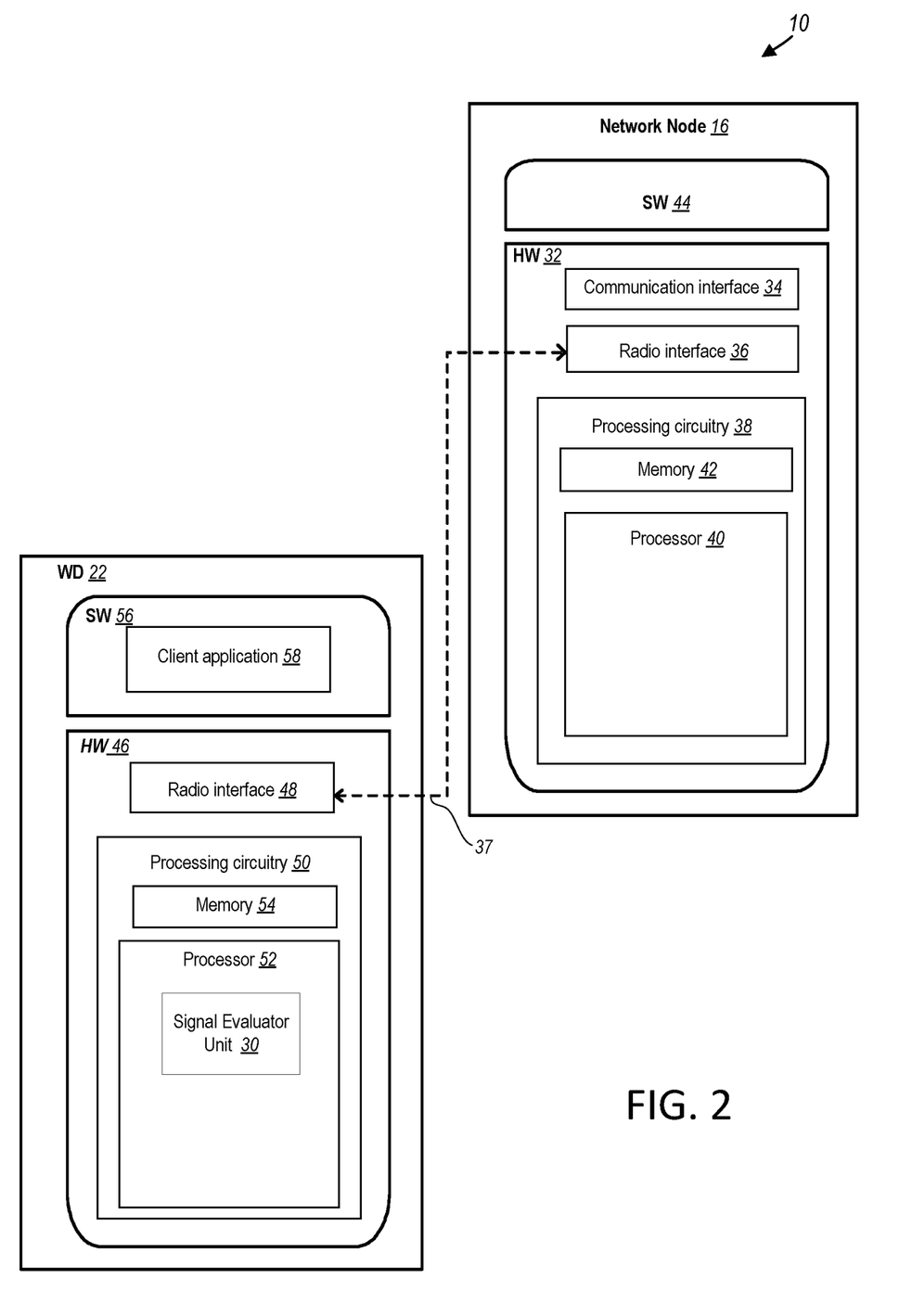
FIG. 2 is a block diagram of a network node and a wireless device communicating over an at least partially wireless connection according to some embodiments of the present disclosure.

In some embodiments, the inner workings of the network node 16 and WD 22, may be as shown in FIG. 2 and independently, the surrounding network topology may be that of FIG. 1.

The wireless connection 37 between the WD 22 and the network node 16 is in accordance with the teachings of the embodiments described throughout this disclosure. In one or more embodiments, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve.

In some embodiments, the cellular network also includes the network node 16 with a radio interface 36. In some embodiments, the network node 16 is configured to, and/or the network node's 16 processing circuitry 38 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the WD 22 is configured to, and/or comprises a radio interface 36 and/or processing circuitry 38 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as signal evaluator unit 30 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
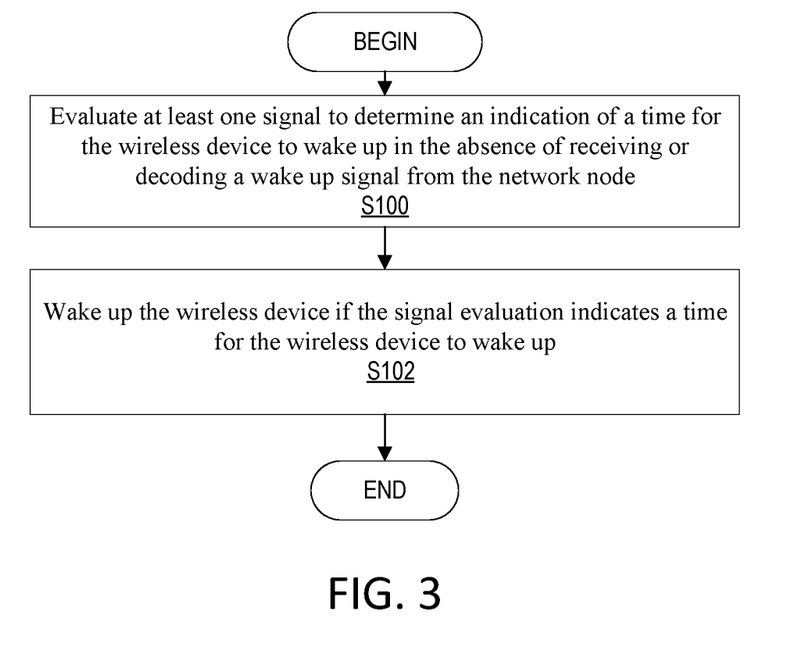
FIG. 3 is a flowchart of an exemplary process in a wireless device according to some embodiments of the present disclosure.

FIG. 3 is a flowchart of an exemplary process in a wireless device 22 according to some embodiments of the present disclosure. One or more blocks described herein may be performed by one or more elements of wireless device 22 such as by one or more of processing circuitry 50 (including the signal evaluator unit 30), processor 52, and/or radio interface 48. Wireless device 22 such as via processing circuitry 50 and/or processor 52 and/or radio interface 48 is configured to evaluate (Block S100) at least one signal to determine an indication of a time for the WD 22 to wake up in the absence of receiving or decoding a wake up signal from the network node, as described herein. The process also includes waking (Block S102) up the WD 22 if the signal evaluation indicates a time for the WD to wake up, as described herein.

Figure 4:
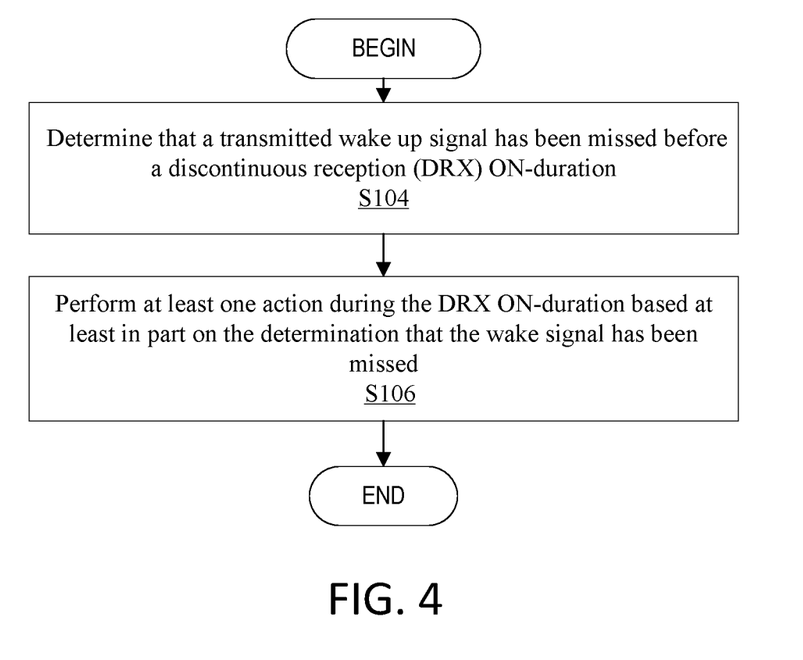
FIG. 4 is a flowchart of an exemplary process in a wireless device according to some embodiments of the present disclosure.

FIG. 4 is a flowchart of another exemplary process in the wireless device 22 according to some embodiments of the disclosure. One or more blocks described herein may be performed by one or more elements of wireless device 22 such as by one or more of processing circuitry 50 (including the signal evaluator unit 30), processor 52, and/or radio interface 48. In one or more embodiments, wireless device 22 such as via one or more of processing circuitry 50, processor 52, signal evaluator unit 30, and radio interface 48 is configured to determine (Block S104) that a transmitted wake up signal has been missed before a discontinuous reception (DRX) ON-duration, as described herein. In one or more embodiments, wireless device 22 such as via one or more of processing circuitry 50, processor 52, signal evaluator unit 30, and radio interface 48 is configured to perform (Block S106) at least one action (i.e., at least one autonomous procedure) during the DRX ON-duration based at least in part on the determination that the wake signal has been missed, as described herein.

According to one or more embodiments of this aspect, the processing circuitry 50 is further configured to determine at least one configuration parameter included in the wake up signal that has been missed by the wireless device, and the at least one action is based at least in part on the at least one configuration parameter. According to one or more embodiments of this aspect, the processing circuitry 50 is further configured to, if the at least one configuration parameter only includes a command to wake up, implement a previously received configuration parameter for monitoring a DRX ON-duration. According to one or more embodiments of this aspect, the at least one configuration parameter corresponds to at least one command related to the missed wake up signal.

According to one or more embodiments of this aspect, the at least one configuration parameter includes a plurality of configuration parameters for monitoring a discontinuous reception, DRX, ON-duration, and the processing circuitry is further configured to select a subset of the plurality of configuration parameters for monitoring the DRX ON-duration, the subset of the plurality of configuration parameters corresponding to one of a default configuration, a configuration based at least in part on previously received configurations and a plurality of configurations. According to one or more embodiments of this aspect, the determination that the wake up signal has been missed is based at least in part on historic traffic data. According to one or more embodiments of this aspect, the determination that the wake up signal has been missed includes analyzing the historic traffic data to determine that traffic data is expected during at least one predefined duration.

According to one or more embodiments of this aspect, the determination that the wake up signal has been missed is based at least in part on a signal quality of a previously received wake up signal. According to one or more embodiments of this aspect, the determination that the wake up signal has been missed is further based at least in part on a detection of a channel state information reference signal, CSI-RS. According to one or more embodiments of this aspect, the at least one action includes:
determining a channel quality between the network node 16 and the wireless device 22, comparing the determined channel quality to a predefined threshold, and
trigger a discontinuous reception, DRX, ON-duration monitoring based at least in part on the comparison. The DRX ON-duration monitoring corresponds to at least one DRX ON-duration associated with the wake up signal that has been missed.

According to one or more embodiments of this aspect, the at least one action includes exiting a sleep state and monitoring a physical downlink control channel, PDCCH, search space in a next discontinuous reception, DRX, ON-duration. According to one or more embodiments of this aspect, the determination that the wake up signal has been missed corresponds to determining the wake up signal has been at least one of not detected and not decoded. According to one or more embodiments of this aspect, the processing circuitry 50 is further configured to determine a demodulation reference signal, DMRS, has been detected, the determination that the wake up signal has been missed being based at least in part on the detected DMRS.

According to one or more embodiments of this aspect, the processing circuitry 50 is further configured to examine power levels of a plurality of resource elements that are configured to carry the wake up signal that has been missed, the determination that the wake up signal has been missed being based at least in part on the examined power levels of the plurality of resource elements. According to one or more embodiments of this aspect, the processing circuitry 50 is further configured to cause transmission of an indication indicating that a wake up signal was missed and that the wireless device 22 performed discontinuous reception, DRX, ON-duration monitoring associated with the wake up signal that has been missed. According to one or more embodiments of this aspect, the indication is a negative acknowledgment, NACK. According to one or more embodiments, the processing circuitry 50 is configured to determine that a channel quality of a first antenna beam is deteriorated based at least in part on detection of another WUS over a second antenna beam during synchronization signal block, SSB, measurements, and the determination that the transmitted wake up signal has been missed is based at least in part on the determination of the channel quality of the first antenna beam.

Having described the general process flow of arrangements of the disclosure and having provided examples of hardware and software arrangements for implementing the processes and functions of the disclosure, the sections below provide details and examples of arrangements for wireless device (WD) 22 autonomous procedures for missed wake up signals (WUS) where, in one or more embodiments, the WUS may be missed before a DRX ON-duration and an action performed during the DRX ON-duration based at least on the missed WUS.

Aspect 1: Criterion for Possible Missing WUS Detection/Decoding

Some information that can be used by the WD 22 such as via one or more of processing circuitry 50, processor 52, radio interface 48, signal evaluator unit 30, etc. as criterion/criteria for possible missed WUS detection and decoding are addressed below:
Expected Traffic/History of Past Traffic In mobile communication, the WD 22 such as via one or more of processing circuitry 50, processor 52, radio interface 48, signal evaluator unit 30, etc. may have an awareness of the currently running applications (i.e., software application(s) operating at WD 22), and thus, the WD 22 has knowledge of the history of the past traffic and can statistically anticipate the upcoming traffic. If, based on this knowledge, the WD 22, such as via processing circuitry 50 and/or signal evaluator unit 30, determines that it has to be awoken, or usually is awoken, on the next ON-duration although there is no WUS detected/decoded such as before a DRX ON-duration, the WD 22 can assume that the WUS has been transmitted but missed. In some embodiments, the number of missed, or simply not detected/received (i.e., deliberately skipped or not received), WUS occasions can also be considered such as via one or more of processing circuitry 50, processor 52, radio interface 48, signal evaluator unit 30, etc. For example, based on the expected traffic, the WD 22 such as via one or more of processing circuitry 50, processor 52, radio interface 48, signal evaluator unit 30, etc. may expect that it should not miss some predetermined number of (X) WUS MOs. In one or more embodiments, a missed WUS or WUS that was missed by the WD 22 may correspond to WUS reception that was deliberately skipped by the WD 22 such that the WD 22 skips a decoding attempt and may also skip sample collection associated with the WUS MO.

In one such embodiment, for example, the WD 22 such as via one or more of processing circuitry 50, processor 52, radio interface 48, signal evaluator unit 30, etc. may observe that video streaming buffer-filling bursts arrive at certain regular intervals, which is likely in low-loaded networks having a regular streaming bit rate. The WD 22 such as via one or more of processing circuitry 50, processor 52, radio interface 48, signal evaluator unit 30, etc. may then monitor ON-durations during the next anticipated buffer-filling burst location even if a WUS is not detected. In one or more embodiments, WD 22 may perform ON-duration monitoring using multiple configurations corresponding to multiple configuration parameters that may be determined/selected based at least in part on the awareness of the currently running applications, for example, as described above, such that decoding of the PDCCH is performed using the multiple configurations. In one such embodiment, for example, the WD 22 such as via one or more of processing circuitry 50, processor 52, radio interface 48, signal evaluator unit 30, etc., may observe that file downloading may be performed at certain intervals. In one such embodiment, for example, the WD 22 such as via one or more of processing circuitry 50, processor 52, radio interface 48, signal evaluator unit 30, etc. may observe that voice-over-NR voice calls may be performed at certain intervals. Other network node 16 events and/or wireless device 22 actions may be considered such that the wireless device 22 may observe/determine that the event(s)/action(s) occur at regular intervals or in pattern over a period of time.

The decision of whether to perform such unconditional ON-duration monitoring may be based on previous and recent WUS reception quality. If the channel conditions and WUS signal format result in reliable detection, and possibly a high decoding margin as assessed via e.g., a soft decoder metric or explicit margin evaluation using tentative decoding, the WD 22 such as via one or more of processing circuitry 50, processor 52, radio interface 48, signal evaluator unit 30, etc. may not perform unconditional monitoring but may rely on WUS reception as a criterion for ON-duration monitoring.

Channel Quality

One of the reasons that the WD 22 such as via one or more of processing circuitry 50, processor 52, radio interface 48, signal evaluator unit 30, etc. may fail to detect/decode the WUS may be that channel quality between the network node and the WD 22 is not sufficient for the WD 22 to decode the WUS. Therefore, once the WD 22 such as via one or more of processing circuitry 50, processor 52, radio interface 48, signal evaluator unit 30, etc. fails to decode the WUS, the WD 22 such as via one or more of processing circuitry 50, processor 52, radio interface 48, signal evaluator unit 30, etc. can check its channel quality, i.e., whether the channel quality at the WUS MO is lower than a certain threshold or not. To do so, the WD 22, such as via processing circuitry 84 and/or signal evaluator unit 30, can use for example, the SSB measurements during the Connected mode-DRX OFF duration or during the On-durations to obtain an up to date channel knowledge. The WD 22 such as via one or more of processing circuitry 50, processor 52, radio interface 48, signal evaluator unit 30, etc. can also utilize the value of signal to interference plus noise ratio (SINR), reference signal received quality (RSRQ), reference signal received power (RSRP), etc. If the channel quality is detected to be lower than what is required for reliable reception of recently transmitted WUS formats and modulation and coding schemes (MCS)/aggregation level (AL), the WD 22 such as via one or more of processing circuitry 50, processor 52, radio interface 48, signal evaluator unit 30, etc. may perform unconditional ON-duration monitoring (i.e., an example of at least one configuration that may correspond to one or more configuration parameters of an autonomous procedure) even if a WUS has not been received.

DMRS Detection

In 3GPP New Radio (NR), a PDCCH transmission is also equipped with the demodulation reference signal (DMRS). The WD 22 such as via one or more of processing circuitry 50, processor 52, radio interface 48, signal evaluator unit 30, etc. can use this reference signal as to determine whether a WUS detection is implied (i.e., WUS was received or likely received before a DRX ON-duration even though the WUS signal, itself, was missed) to determine whether to wake-up on the next ON-duration. The presence of demodulation reference signals (DMRS) can be determined e.g., by performing matched filtering of the DMRS resource elements (REs) with reference DMRS patterns that the WD 22 would expect to be present for WUS-PDCCH detection and decoding. Depending on the channel variations (dispersion and Doppler) and coherence time/bandwidth (BW), the WD 22 such as via one or more of processing circuitry 50, processor 52, radio interface 48, signal evaluator unit 30, etc. may perform matched filtering with full or partial (locally coherent) DMRS patterns. For example, a correlation matrix output from the match filter representing the DMRS signal can be used as a tentative indication that there is actually a WUS being transmitted by the network node 16 (i.e., implied WUS) although the WD 22 such as via one or more of processing circuitry 50, processor 52, radio interface 48, signal evaluator unit 30, etc. determines the WUS was missed, i.e., does not successfully detect/decode the WUS in the WUS MOs. Depending on the WUS configuration, the presence of DMRS may also be detected such as via one or more of processing circuitry 50, processor 52, radio interface 48, signal evaluator unit 30, etc. if a WUS is transmitted to other WDs 22, or other (non-WUS) PDCCH transmissions are present. The WD 22 such as via one or more of processing circuitry 50, processor 52, radio interface 48, signal evaluator unit 30, etc. may determine whether to trigger ON-duration monitoring based on DMRS indications depending on the individual trade-off between the increased energy cost of additional ON-duration monitoring and latency/throughput losses due to missing relevant ON-durations. The trade-offs may depend on current traffic types or services, battery state, etc.

Power Level in the Resource Elements

In the WUS transmission, it is possible that the disruption occurs only in a certain number of the information bits. For cases where the WUS has reserved frequency for transmission per cell, the WD 22, such as via processing circuitry 50 and/or signal evaluator unit 30, can examine the power across all the resource elements used for the presumed WUS transmission (i.e., implied WUS detection even though the WUS was determined to have been missed before a DRX ON-duration). A significant number of REs inside the WUS resource region having power that exceeds a certain threshold can be used by the WD 22 as an indication that there is actually a WUS transmission by the network node 16 even when there was no WUS successfully detected or decoded. The threshold may be an absolute power threshold, or the threshold may be formulated as a ratio of RE powers in relation to average occupied RE power, average total carrier power, or to power of REs surrounding the WUS resource region.

The decision of whether or not the WD 22 should do the autonomous procedure (i.e., at least one action such as during the DRX ON-duration) can be determined in different ways. For example, the WD 22 such as via one or more of processing circuitry 50, processor 52, radio interface 48, signal evaluator unit 30, etc. can decide to take further action if one of the parameter's value is larger/smaller than the threshold value. In another option, the WD 22 such as via one or more of processing circuitry 50, processor 52, radio interface 48, signal evaluator unit 30, etc. can decide to take further action if a certain number of parameter's values are larger than the threshold values. In a more advanced option, the WD 22 such as via one or more of processing circuitry 50, processor 52, radio interface 48, signal evaluator unit 30, etc. can multiply each gap between the observed values and the threshold values with a certain weighting function. In addition, a threshold value can be set as a fixed value or it is also possible to set the threshold value to depend on the transmission configuration (e.g., the number of receive antennas, bandwidth, mobility, etc.), or even historical data. Furthermore, the threshold value can be in terms of a real value or the Boolean type of value. If the total weighted gap exceeds a certain threshold, the WD 22 then can perform the autonomous procedures such as via one or more of processing circuitry 50, processor 52, radio interface 48, signal evaluator unit 30, etc.

Aspect 2: WD 22 Procedures (i.e., Actions) in Response to the Possible Missed WUS Detection/Decoding After examining the parameters mentioned in Aspect 1, the WD 22 such as via one or more of processing circuitry 50, processor 52, radio interface 48, signal evaluator unit 30, etc. can then take/perform further actions or perform certain procedures such as during the DRX ON-duration. If the signal to be evaluated or other examined metric is below a certain threshold, the WD 22 such as via one or more of processing circuitry 50, processor 52, radio interface 48, signal evaluator unit 30, etc. can take/perform the normal action defined by the network node 16, i.e., to sleep in the next DRX ON-duration. If the examination metric exceeds a certain threshold, the WD 22 such as via one or more of processing circuitry 50, processor 52, radio interface 48, signal evaluator unit 30, etc. can take/perform one or several possible corrective actions, as discussed below.

Monitor ON-Duration Despite not Receiving a WUS

In some embodiments, the WD 22 such as via one or more of processing circuitry 50, processor 52, radio interface 48, signal evaluator unit 30, etc. can wake-up in the upcoming DRX ON-duration even when there is no WUS detected before the upcoming DRX ON-duration. The configuration that can be used by the WD 22 such as via one or more of processing circuitry 50, processor 52, radio interface 48, signal evaluator unit 30, etc. when it wakes up depends on the typical commands that are contained in the WUS such as commands in previously received WUSs or command(s) associated with a default configuration, or based on the default configuration, or the latest configuration that the WD 22 has operated in for the preceding active time. If the WUS that was missed by the WD 22 only has command to wake-up the WD 22, i.e., the WD configuration follows other commands such as RRC configuration, etc., the WD 22 such as via one or more of processing circuitry 50, processor 52, radio interface 48, signal evaluator unit 30, etc. can wake-up in those configurations as the WD 22 may determine that the command in WUS was likely for one or more of those configurations. In other words, in some embodiments, the WD 22 is determining the most likely command (s) (or expected command(s)) included in the WUS that was missed by the WD 22 such that the WD 22 can implement these command(s). As used herein in one or more embodiments, a command may be related the missed wake up signal.

In one or more embodiments, when the WUS that was missed before a DRX ON-duration by the WD 22 also contains the configuration (e.g., the number of active ports/antennas, active bandwidth part (BWP), etc.) in which the WD 22 should wake-up, the WD 22 such as via one or more of processing circuitry 50, processor 52, radio interface 48, signal evaluator unit 30, etc. can wake-up in the most probable configuration(s) (i.e., most likely or expected configuration(s) as determined herein) or the fallback mode (i.e., a default configuration such as a no mode switching command(s)). The most probable configuration(s) can be determined, for example, by keeping the history of the previous configurations between the WD 22 and the respective serving cell. The most probable configuration(s) where the WD 22 wakes up can also be determined in a manner related to this history. For example, if the WD 22 is historically scheduled with PDCCH having configuration A for 80% of the time (i.e., a predefined time period over which historical data is evaluated) and with PDCCH having configuration B for 20% of the time, the WD 22 such as via one or more of processing circuitry 50, processor 52, radio interface 48, signal evaluator unit 30, etc., can wake up in the configuration A, 80% of instances where the WD 22 does not detect WUS and in the configuration B, 20% of the instances where the WD 22 does not detect WUS. In one example, the selection between configuration A and configuration B during one or more instances may be performed randomly or in a predefined manner, but where the total instances where the WD 22 do not detect WUS, configuration A is implemented 80% and configuration B is implemented 20%.

In addition, if the WD 22 is capable, the WD 22 such as via one or more of processing circuitry 50, processor 52, radio interface 48, signal evaluator unit 30, etc. could also wake in more than one configuration simultaneously (e.g., wakes up in two different BWP configurations or perform tentative PDCCH decoding according to multiple SS and/or WUS format configurations).

Indicate Missed WUS to NW

In addition to the above, the WD 22 such as via one or more of processing circuitry 50, processor 52, radio interface 48, signal evaluator unit 30, etc. could also send a special NACK indication (different from PDSCH ACK/NACK) through PUCCH when the WD 22 does not detect the WUS before a DRX ON-duration but wakes up anyway such as during the DRX ON-duration and successfully detects/decodes PDCCH such as according to one or more determined actions. When receiving this NACK, the network node 16 could then take actions such as sending a more robust WUS in the next WUS MOs.

Modify WUS Receiver Configuration

In another addition to the primary procedure, the WD 22 such as via one or more of processing circuitry 50, processor 52, radio interface 48, signal evaluator unit 30, etc. may also change its antenna configuration for reception of PDCCH based WUS or any type of WUS in general. For example, in case the WD 22 in default mode only uses a single antenna, it could increase the number of antennas and employ spatial receiver processing techniques, e.g., maximum ratio combining (MRC), equal gain combining (EGC), or interference rejection combining (IRC) to improve the received quality of the WUS signal in the next WUS MO.

Other Aspects

In cases where the network node 16 sends a WUS followed by a scheduled aperiodic channel state information reference signal (CSI-RS) (when the WD 22 is expected to send a CSI report back to the network node as an acknowledgement of WUS detection/decoding), the WD 22 such as via one or more of processing circuitry 50, processor 52, radio interface 48, signal evaluator unit 30, etc. may stay awake and monitor the coming CSI-RS. The detection of the CSI-RS can also be an indicator of a missing WUS. Then, the WD 22 such as via one or more of processing circuitry 50, processor 52, radio interface 48, signal evaluator unit 30, etc. may perform channel estimation and report CSI back to the network node 16. This option can be done especially for the case of the WUS intended for all users or for a specific user. The CSI report may include an indicator, e.g., a bit flag indicating that a WUS was not successfully decoded.

In a multi-beam scenario, the WD 22 may expect a WUS over a second specific antenna beam in case SSB measurements lead to the WD 22 understanding that the channel quality of a first specific antenna beam is deteriorated. Then the WD 22 such as via one or more of processing circuitry 50, processor 52, radio interface 48, signal evaluator unit 30, etc. can choose to proceed with the autonomous procedures described herein such as by monitoring an on-duration or applying a previously detected command, for example, instead of conducting the default process (i.e., to remain in sleep mode). As such, the WD 22 such as via one or more of processing circuitry 50, processor 52, radio interface 48, signal evaluator unit 30, etc. can ignore the WUS operation, wake up for the ON-duration and start the beam recovery procedure.

In one embodiment, the WD 22 such as via one or more of processing circuitry 50, processor 52, radio interface 48, signal evaluator unit 30, etc. may determine that an atypical break in data transmissions has occurred, e.g., according to the typical traffic pattern considerations described above. If the WD 22 observes that no further data is being scheduled to it, e.g., due to radio link failure (RLF) triggered by missed WUS detection and resulting lack of ACK/NACK feedback on multiple PDSCH transmissions, the WD 22 such as via one or more of processing circuitry 50, processor 52, radio interface 48, signal evaluator unit 30, etc. may perform tentative uplink (UL) transmission, e.g., UL resource request using its radio network temporary identifier (RNTI). If the network node 16 responds with a grant, the WD 22 such as via one or more of processing circuitry 50, processor 52, radio interface 48, signal evaluator unit 30, etc. may conclude that the network node 16 continues to consider it in connected mode. If the network node 16 does not respond, the WD 22 such as via one or more of processing circuitry 50, processor 52, radio interface 48, signal evaluator unit 30, etc. may perform an UL access procedure using a regular random-access procedure to re-enter connected mode.

Some embodiments mitigate the throughput loss and minimize the power saving lost due to the missed WUS in NR WD 22. Some embodiments reduce/minimize the retransmission procedures as a consequence of the missed WUS in WD 22 and the network node 16.

According to one aspect, a WD 22 is configured to communicate with a network node 16, and includes processing circuitry 50 configured to evaluate at least one signal to determine an indication of a time for the WD 22 to wake up in the absence of receiving or decoding a wake up signal from the network node 16. The processing circuitry 50 is further configured to wake up the WD 22 if the signal evaluation indicates a time for the WD 22 to wake up.

According to this aspect, in some embodiments, the at least one signal is one of a demodulation reference signal, DMRS, signal to interference plus noise ratio, SINR, a reference signal received quality, RSRQ, and a reference signal received power, RSRP. In some embodiments, the evaluation includes a comparison between a signal of the at least one signal to a threshold.

According to another aspect, a method implemented in a wireless device (WD 22) is provided. The method includes evaluating at least one signal to determine an indication of a time for the WD 22 to wake up in the absence of receiving or decoding a wake up signal from the network node. The method also includes waking up the WD 22 if the signal evaluation indicates a time for the WD 22 to wake up.

According to this aspect, in some embodiments, the at least one signal is one of a demodulation reference signal, DMRS, signal to interference plus noise ratio, SINR, a reference signal received quality, RSRQ, and a reference signal received power, RSRP. In some embodiments, the evaluation includes a comparison between a signal of the at least one signal to a threshold.

SOME EXAMPLES

Example A1

A wireless device 22 (WD 22) configured to communicate with a network 16 node, the WD 22 configured to, and/or comprising a radio interface 48 and/or processing circuitry 50 configured to:
   evaluate at least one signal to determine an indication of a time for the WD 22 to wake up in the absence of receiving or decoding a wake up signal from the network node; and
   wake up the WD 22 if the signal evaluation indicates a time for the WD 22 to wake up.

Example A2

The WD 22 of Example A1, wherein the at least one signal is one of a demodulation reference signal, DMRS, signal to interference plus noise ratio, SINR, a reference signal received quality, RSRQ, and a reference signal received power.

Example A3

The WD 22 of Example A1, wherein the evaluation includes a comparison between a signal of the at least one signal to a threshold.

Example B1

A method implemented in a wireless device 22 (WD 22), the method comprising:

evaluating at least one signal to determine an indication of a time for the WD 22 to wake up in the absence of receiving or decoding a wake up signal from the network node 16;

waking up the WD 22 if the signal evaluation indicates a time for the WD 22 to wake up.

Example B2

The method of Example B1, wherein the at least one signal is one of a demodulation reference signal, DMRS, signal to interference plus noise ratio, SINR, a reference signal received quality, RSRQ, and a reference signal received power.

Example B3

The method of Example B1, wherein the evaluation includes a comparison between a signal of the at least one signal to a threshold.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to communicate with a network node, the wireless device comprising:
processing circuitry configured to:
before a discontinuous reception, DRX, ON-duration, determine that a transmitted wake up signal has been missed;
determine that a demodulation reference signal, DMRS, has been detected, the determination that the wake up signal has been missed being based at least in part on the detected DMRS; and
perform at least one action during the DRX ON-duration based at least in part on the determination before the DRX ON-duration that the wake signal has been missed.

2. The wireless device of claim 1, wherein the processing circuitry is further configured to determine at least one configuration parameter included in the wake up signal that has been missed by the wireless device; and the at least one action being based at least in part on the at least one configuration parameter.

3. The wireless device of claim 2, wherein the processing circuitry is further configured to, if the at least one configuration parameter only includes a command to wake up, implement a previously received configuration parameter for monitoring the DRX ON-duration.

4. The wireless device of claim 2, wherein the at least one configuration parameter corresponds to at least one command related to the missed wake up signal.

5. The wireless device of claim 4, wherein the at least one configuration parameter includes a plurality of configuration parameters for monitoring the DRX ON-duration; and the processing circuitry being further configured to select a subset of the plurality of configuration parameters for monitoring the DRX ON-duration, the subset of the plurality of configuration parameters corresponding to one of a default configuration, a configuration based at least in part on previously received configurations and a plurality of configurations.

6. The wireless device of claim 1, wherein the determination that the wake up signal has been missed is based at least in part on historic traffic data.

7. The wireless device of claim 6, wherein the determination that the wake up signal has been missed includes analyzing the historic traffic data to determine that traffic data is expected during at least one predefined duration.

8. The wireless device of claim 1, wherein the determination that the wake up signal has been missed is further based at least in part on a detection of a channel state information reference signal, CSI-RS.

9. The wireless device of claim 1, wherein the at least one action includes:

determining a channel quality between the network node and the wireless device;

comparing the determined channel quality to a predefined threshold; and triggering the DRX ON-duration monitoring based at least in part on the comparison, the DRX ON-duration monitoring corresponding to at least one DRX ON-duration associated with the wake up signal that has been missed.

10. The wireless device of claim 1, wherein the at least one action includes exiting a sleep state and monitoring a physical downlink control channel, PDCCH, search space in a next DRX ON-duration.

11. The wireless device of claim 1, wherein the determination that the wake up signal has been missed corresponds to determining the wake up signal has been at least one of not detected and not decoded.

12. The wireless device of claim 1, wherein the processing circuitry is further configured to examine power levels of a plurality of resource elements that are configured to carry the wake up signal that has been missed, the determination that the wake up signal has been missed being based at least in part on the examined power levels of the plurality of resource elements.

13. The wireless device of claim 1, wherein the processing circuitry is further configured to cause transmission of an indication indicating that a wake up signal was missed and that the wireless device performed DRX ON-duration monitoring associated with the wake up signal that has been missed.

14. The wireless device of claim 13, wherein the indication is a negative acknowledgment, NACK.

15. The wireless device of claim 1, wherein the processing circuitry is further configured to determine that a channel quality of a first antenna beam is deteriorated based at least in part on detection of another WUS over a second antenna beam during synchronization signal block, SSB, measurements; and the determination that the transmitted wake up signal has been missed being based at least in part on the determination of the channel quality of the first antenna beam.

16. A method implemented by a wireless device that is configured to communicate with a network node, the method comprising:

before a discontinuous reception, DRX, ON-duration, determining that a transmitted wake up signal has been missed;

determining that a demodulation reference signal, DMRS, has been detected, the determination that the wake up signal has been missed being based at least in part on the detected DMRS; and performing at least one action during the DRX ON-duration based at least in part on the determination before the DRX ON-duration that the wake signal has been missed.

17. The method of claim 16, further comprising determining at least one configuration parameter included in the wake up signal that has been missed by the wireless device; and the at least one action being based at least in part on the at least one configuration parameter.

18. The method of claim 17, further comprising, if the at least one configuration parameter only includes a command to wake up, implementing a previously received configuration parameter for monitoring the DRX ON-duration.

19. The method of claim 17, wherein the at least one configuration parameter corresponds to at least one command related to the missed wake up signal.

20. The method of claim 19, wherein the at least one configuration parameter includes a plurality of configuration parameters for monitoring the DRX ON-duration; and the method further comprising selecting a subset of the plurality of configuration parameters for monitoring the DRX ON-duration, the subset of the plurality of configuration parameters corresponding to one of a default configuration, a configuration based at least in part on previously received configurations and a plurality of configurations.

21. The method of claim 16, wherein the determination that the wake up signal has been missed is based at least in part on historic traffic data.

22. The method of claim 21, wherein the determination that the wake up signal has been missed includes analyzing the historic traffic data to determine that traffic data is expected during at least one predefined duration.

23. The method of claim 16, wherein the determination that the wake up signal has been missed is further based at least in part on a detection of a channel state information reference signal, CSI-RS.

24. The method of claim 16, wherein the at least one action includes:

determining a channel quality between the network node and the wireless device;

comparing the determined channel quality to a predefined threshold; and triggering the DRX ON-duration monitoring based at least in part on the comparison, the DRX ON-duration monitoring corresponding to at least one DRX ON-duration associated with the wake up signal that has been missed.

25. The method of claim 16, wherein the at least one action includes exiting a sleep state and monitoring a physical downlink control channel, PDCCH, search space in a next DRX ON-duration.

26. The method of claim 16, wherein the determination that the wake up signal has been missed corresponds to determining the wake up signal has been at least one of not detected and not decoded.

27. The method of claim 16, further comprising examining power levels of a plurality of resource elements that are configured to carry the wake up signal that has been missed, the determination that the wake up signal has been missed being based at least in part on the examined power levels of the plurality of resource elements.

28. The method of claim 16, further comprising causing transmission of an indication indicating that a wake up signal was missed and that the wireless device performed DRX ON-duration monitoring associated with the wake up signal that has been missed.

29. The method of claim 28, wherein the indication is a negative acknowledgment, NACK.

30. The method of claim 16, further comprising determining that a channel quality of a first antenna beam is deteriorated based at least in part on detection of another WUS over a second antenna beam during synchronization signal block, SSB, measurements; and the determination that the transmitted wake up signal has been missed being based at least in part on the determination of the channel quality of the first antenna beam.

31. A non-transitory computer readable medium comprising instructions which, when executed by a processor, cause the processor to:

before a discontinuous reception, DRX, ON-duration, determine that a transmitted wake up signal has been missed;

determine that a demodulation reference signal, DMRS, has been detected, the determination that the wake up signal has been missed being based at least in part on the detected DMRS; and perform at least one action during the DRX ON-duration based at least in part on the determination before the DRX ON-duration that the wake signal has been missed.

\* \* \* \* \*